(12) United States Patent
Meschkat et al.

(10) Patent No.: US 9,021,348 B1
(45) Date of Patent: Apr. 28, 2015

(54) COMPOSITION OF TEMPLATES USING TRANSCLUSION THAT GUARANTEE A VALID HTML DOCUMENT

(75) Inventors: Steffen Meschkat, Zurich (CH); Constantinos Michael, New York, NY (US); Tobias Boonstoppel, New York, NY (US); Stefan Haustein, Zurich (CH)

(73) Assignee: Google Inc., Mountain View, CA (US)

( * ) Notice: Subject to any disclaimer, the term of this patent is extended or adjusted under 35 U.S.C. 154(b) by 529 days.

(21) Appl. No.: 13/253,696

(22) Filed: Oct. 5, 2011

Related U.S. Application Data

(60) Provisional application No. 61/431,735, filed on Jan. 11, 2011, provisional application No. 61/449,550, filed on Mar. 4, 2011.

(51) Int. Cl.
   *G06F 17/00* (2006.01)
   *G06F 17/21* (2006.01)
   *G06F 15/163* (2006.01)

(52) U.S. Cl.
   CPC ............ *G06F 17/212* (2013.01); *G06F 15/163* (2013.01)

(58) Field of Classification Search
   USPC ........................................................ 715/235
   See application file for complete search history.

(56) References Cited

U.S. PATENT DOCUMENTS

| | | | |
|---|---|---|---|
| 6,263,352 B1 | 7/2001 | Cohen | |
| 6,738,804 B1 | 5/2004 | Lo | |
| 6,938,205 B1 | 8/2005 | Hanson et al. | |
| 6,981,212 B1 | 12/2005 | Claussen et al. | |
| 7,093,193 B1 * | 8/2006 | Goldberg | 715/207 |
| 7,111,231 B1 | 9/2006 | Huck et al. | |
| 7,640,512 B1 | 12/2009 | Appling | |
| 7,685,609 B1 | 3/2010 | McLellan | |
| 7,698,321 B2 | 4/2010 | Hackworth | |
| 7,844,894 B2 | 11/2010 | Khopkar et al. | |
| 7,958,232 B1 | 6/2011 | Colton et al. | |
| 2002/0188631 A1 | 12/2002 | Tiemann et al. | |
| 2003/0221184 A1 | 11/2003 | Gunjal et al. | |
| 2004/0111671 A1 | 6/2004 | Lu et al. | |
| 2004/0187080 A1 | 9/2004 | Brooke et al. | |
| 2004/0199497 A1 | 10/2004 | Timmons | |
| 2005/0060317 A1 | 3/2005 | Lott et al. | |
| 2005/0289178 A1 | 12/2005 | Angus | |
| 2006/0107206 A1 | 5/2006 | Koskimies | |

(Continued)

OTHER PUBLICATIONS

Meschkat, "Simple and robust browser side template processing for Ajax based web applications" WWW 2008, Apr. 21-25, Beijing, China, p. 1-7.*

(Continued)

*Primary Examiner* — Amelia Tapp
(74) *Attorney, Agent, or Firm* — Dority & Manning, P.A.

(57) ABSTRACT

A system, method and computer-readable medium for composing a valid HTML document using template transclusion. A system includes a memory configured to store a transcluded template file, the transcluded template file includes a transcluded template and a transcluding template file, the transcluding template file including a transcluding template, the transcluding template including credentials to the transcluded template. The system also includes a template building module configured to build a transcluded template object from the transcluded template and a transcluding template object from the transcluding template, where the transcluded template object and the transcluding template object generate a valid HTML document that is sent for display on a browser.

23 Claims, 7 Drawing Sheets

(56) References Cited

U.S. PATENT DOCUMENTS

| | | | |
|---|---|---|---|
| 2006/0212804 A1 | 9/2006 | Jackson et al. | |
| 2006/0242575 A1 | 10/2006 | Winser | |
| 2007/0033280 A1 | 2/2007 | Popp et al. | |
| 2007/0050407 A1 | 3/2007 | Chen et al. | |
| 2007/0078810 A1 | 4/2007 | Hackworth | |
| 2007/0233902 A1 | 10/2007 | Trefler et al. | |
| 2008/0028302 A1* | 1/2008 | Meschkat | 715/255 |
| 2008/0040653 A1 | 2/2008 | Levine | |
| 2008/0077653 A1 | 3/2008 | Morris | |
| 2008/0133722 A1 | 6/2008 | Ramasundaram et al. | |
| 2008/0275951 A1 | 11/2008 | Hind et al. | |
| 2009/0019386 A1 | 1/2009 | Sweetland et al. | |
| 2009/0063499 A1 | 3/2009 | Koinuma et al. | |
| 2010/0037150 A1 | 2/2010 | Sawant | |
| 2010/0058467 A1 | 3/2010 | Ivory et al. | |
| 2010/0070566 A1 | 3/2010 | Vandewalle | |
| 2010/0306738 A1 | 12/2010 | Verma et al. | |

OTHER PUBLICATIONS

Meschkat, "jstemplate.js", source code file retrieved from http://google-jstemplate.googlecode.com/svn/trunk, copyright 2006 Google Inc., p. 1-13.*

Meschkat, "util.js", source code file retrieved from http://google-jstemplate.googlecode.com/svn/trunk, copyright 2006 Google Inc., p. 1-6.*

Varda, "Protocol Buffers: Google's Data Interchange Format" retrieved from http://google-opensource.blogspot.com/ "Open Source at Google", published Jul. 7, 2008, p. 1-13.*

Meschkat, "jsevalcontext.js", source code file retrieved from http://google-jstemplate.googlecode.com/svn/trunk, copyright 2006 Google Inc., p. 1-6.*

Meschkat, "jstemplate_test.js", source code file retrieved from http://google-jstemplate.googlecode.com/svn/trunk, copyright 2006 Google Inc., p. 1-6.* http://google-jstemplate.googlecode.com/svn/trunk, 1 page, discloses a listing of source code files for jstemplate.*

Kolbitsch et al., "Transclusions in an HTML-Based Environment", Journal of Computing and Information Technology—CIT 14, 2006, 2, 161-174.*

Nelson et al., "Back to the Future: Hypertext the Way It Used to Be" HT'07, Sep. 10-12, 2007, Manchester, United Kingdom, p. 227-228.*

Bernstein, "Shadows in the Cave: hypertext transformations" Journal of Digital Information, vol. 10, No. 3 (2009), p. 1-10.*

Kaur et al., "An Evaluation of Protocol Buffer," Proceedings of IEEE SoutheastCon 2010, Mar. 18-21, 2010, pp. 459-462 (4 pages).

Stoker, "Toucan: A Configurable Web Site Maintenance Tool", Dissertation, 2001, University of Sheffield, 44 pages.

Hoffman, Thad, Using XML Data Islands in Mozilla, Plus Linked Files, The Mozilla Organization, Apr. 3, 2003, archived Sep. 9, 2004 http://www.mozi II a.org/xm lextras/xm ldataislands/ (19 pages).

"HSP/EzStor Tutorial" Copyright 2003 EzTools Software, archived Jun 3, 2009 http://www.eztoolssoftware.com/tutorials/hsp/hsp howto 1, Htm (8 pages).

McFarlane, Nigel, "Make Data Islands Work in All Browsers", archived Feb. 5, 2006, http://www.devx.com/webdev/Article/28898 (9 pages).

Goodman, Brett, "Client-side ASP scripting with HTML Scripting Pages" Copyright 2000-2001, http://www.aspfree.co m/c/a/ ASP /C I ie nts ide -ASP-scripting -with -HTM L -Scripting-Pages/ (4 pages).

Jacobs, James Q., "XML Data Binding"© 2004, http://www.jqjacobs.net/web/xml/xml_data_binding.html (3 pages).

Wisman, Raymond, "Client-side XML", archived Jun. 6, 2008, http://homepages.ius.edu/rwisman/n341 /htmi/XML.htm (6 pages).

Co-Pending U.S. Appl. No. 13/253,663, Michael et al., filed Oct. 5, 2011(not published) (36 pages).

Office Action mailed Dec. 16, 2011, in U.S. Appl. No. 13/253,663, Michael et al., filed Oct. 5, 2011 (11 pages).

Co-Pending U.S. Appl. No. 13/253,780, Michael et al., filed Oct. 5, 2011(not published) (37 pages).

Office Action mailed Dec. 20, 2011, in U.S. Appl. No. 13/253,780, Michael et al., filed Oct. 5, 2011 (11 pages).

Co-Pending U.S. Appl. No. 13/253,814, Michael et al., filed Oct. 5, 2011 (not published) (22 pages).

Office Action mailed Feb. 21, 2012, in U.S. Appl. No. 13/253,814, Michael et al., filed Oct. 5, 2011 (8 pages).

Co-Pending U.S. Appl. No. 13/245,823, Michael et al., filed Sep. 26, 2011 (not published) (41 pages).

Office Action mailed Nov. 17, 2011, in U.S. Appl. No. 13/245,823, Michael et al., filed Sep. 26, 2011 (13 pages).

Co-Pending U.S. Appl. No. 13/245,831, Michael et al., filed Sep. 26, 2011 (not published) (35 pages).

Office Action mailed Dec. 9, 2011, in U.S. Appl. No. 13/245,831, Michael et al., filed Sep. 26, 2011 (14 pages).

"Jstemplates: Quick example," accessed at http://code.google.com/p/google-jstemplate/source/browsel?r=10, 71 pages (Aug. 19, 2008).

"Open HTML from Kindle file system w/ browser," MobileRead Forums, MobileRead.com, discussion extending from May 1, 2009 to May 3, 2009, accessed at http://www.mobileread.com/forums/printthread.php?s=287962ca817c56df47bd0a254ba201f6 &t=45969, accessed on Jul. 16, 2012.

"Possible to Load an Array from a File?—comp.lang.javascript," Google Groups, discussion extending from Nov. 15, 2002-Nov. 17, 2002, accessed at http://groups.google.com/group/comp.lang.javascript!browse_thread/thread/ac4fc6ff989fbe58?h1=en &noredirect=true&pli=1, accessed on Jul. 11, 2012, 4 pages.

Brabrand, Claus et al., "Language-based Caching of Dynamically Generated HTML," in *World Wide Web: Internet Web and Information Systems*, Kluwer Academic Publishers, Netherlands, pp. 305-323 (2002).

Edwards, Dean, "How to Load and Parse XML Data Without ActiveX," accessed at http://dean.edwards.name/weblog/2006/04/easyxml/, accessed on May 30, 2012, 6 pages (published Apr. 2006).

Fox, Joshua et al., "Hyper-programming Web Applications," in *Proceedings of the Second Australian Undergraduate Students 'Computing Conference*, AUSCC, pp. 59-66 (2004).

Malabarba, Scott et al., "Runtime Support for Type-Safe Dynamic Java Classes," in *Lecture Notes in Computer Science* (LNCS), Elisa Bertino Ed., Springer-Verlag, Berlin, Germany, pp. 337-361 (2000).

Sivoneen, Henri et al., "Assembling Web Pages Using Document Trees," http://hsinoven.ikifi/cms/te/, archived at waybackmachine.com, 28 pages (as published on Apr. 3, 2004).

Office Action mailed May 25, 2012 in U.S. Appl. No. 13/253,663, Michael et al., filed Oct. 5, 2011, 12 pages.

Office Action mailed Jun. 11, 2012 in U.S. Appl. No. 13/253,780, Michael et al., filed Oct. 5, 2011, 13 pages.

Office Action mailed Jul. 19, 2012 in U.S. Appl. No. 13/253,814, Michael et al., filed Oct. 5, 2011, 9 pages.

Office Action mailed Apr. 19, 2012 in U.S. Appl. No. 13/245,823, Michael et al., filed Sep. 26, 2011, 11 pages.

Office Action mailed Sep. 17, 2012 in U.S. Appl. No. 13/245,823, Michael et al., filed Sep. 26, 2011, 11 pages.

Office Action mailed Apr. 4, 2012 in U.S. Appl. No. 13/245,831, Michael et al., filed Sep. 26, 2011, 23 pages.

Co-Pending U.S. Appl. No. 13/407,431, Michael et al., filed Sep. 26, 2011 (not published) 1 page.

* cited by examiner

COMPOSITION OF TEMPLATES USING TRANSCLUSION THAT GUARANTEE A VALID HTML DOCUMENT

This application claims the benefit of U.S. Provisional Application No. 61/431,735, filed on Jan. 11, 2011 and is incorporated by reference in its entirety. This application also claims the benefit of U.S. Provisional Application No. 61/449,550 filed on Mar. 4, 2011 and is incorporated by reference in its entirety.

BACKGROUND

The emergence and development of computer networks and protocols, such as the Internet and the World Wide Web (or simply "web" or "Web"), allows a user to use their computing devices to download and display a webpage on the user's computing device. When a webpage includes many different sections or identical sections are included in different webpages, those sections may be represented using templates.

Conventional template processing systems, however, cannot render a template within a template on a webpage and guarantee a valid HTML document. When a conventional system, includes a template within a template the included template is treated as HTML text. As a result, even when individual templates produce a valid HTML document, the conventional template processing system cannot guarantee that the produced HTML document that includes transcluded templates is valid.

BRIEF SUMMARY

Methods, systems, and computer program products are disclosed for composing a valid HTML document using template transclusion.

According to an embodiment, a method for composing a valid HTML document using template transclusion is provided. In an embodiment, the method retrieves a transcluded template file, the transcluded template file includes the transcluded template. The method also retrieves a transcluding template file, the transcluding template file includes a transcluding template and credentials to the transcluded template file and the transcluded template. The method also builds a transcluded template object from the transcluded template and a transcluding template object from the transcluding template, wherein the transcluded template object and the transcluding template object generate a valid HTML document that is sent for display on a browser.

In an embodiment, a system for composing a valid HTML document using template transclusion is provided. A system includes a memory configured to store a transcluded template file, the transcluded template file includes a transcluded template and a transcluding template file, the transcluding template file includes a transcluding template, the transcluding template includes credentials to the transcluded template. The system also includes a template building module configured to build a transcluded template object from the transcluded template and a transcluding template object from the transcluding template, where the transcluded template object and the transcluding template object generate a valid HTML document that is sent for display on a browser.

According to another embodiment, an article of manufacture including a computer-readable medium having instructions stored thereon that, when executed by a computing device, cause the computing device to perform operations composing a valid HTML document using template transclusion is provided. In an embodiment, the computer-readable medium includes operations for retrieving a transcluded template file, the transcluded template file including the transcluded template. The computer-readable medium also includes operations for retrieving a transcluding template file, the transcluding template file includes a transcluding template and credentials to the transcluded template file and the transcluded template. The computer-readable medium also includes operations for building a transcluded template object from the transcluded template and a transcluding template object from the transcluding template, wherein the transcluded template object and the transcluding template object generate a valid HTML document that is sent for display on a browser.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Figure 1:
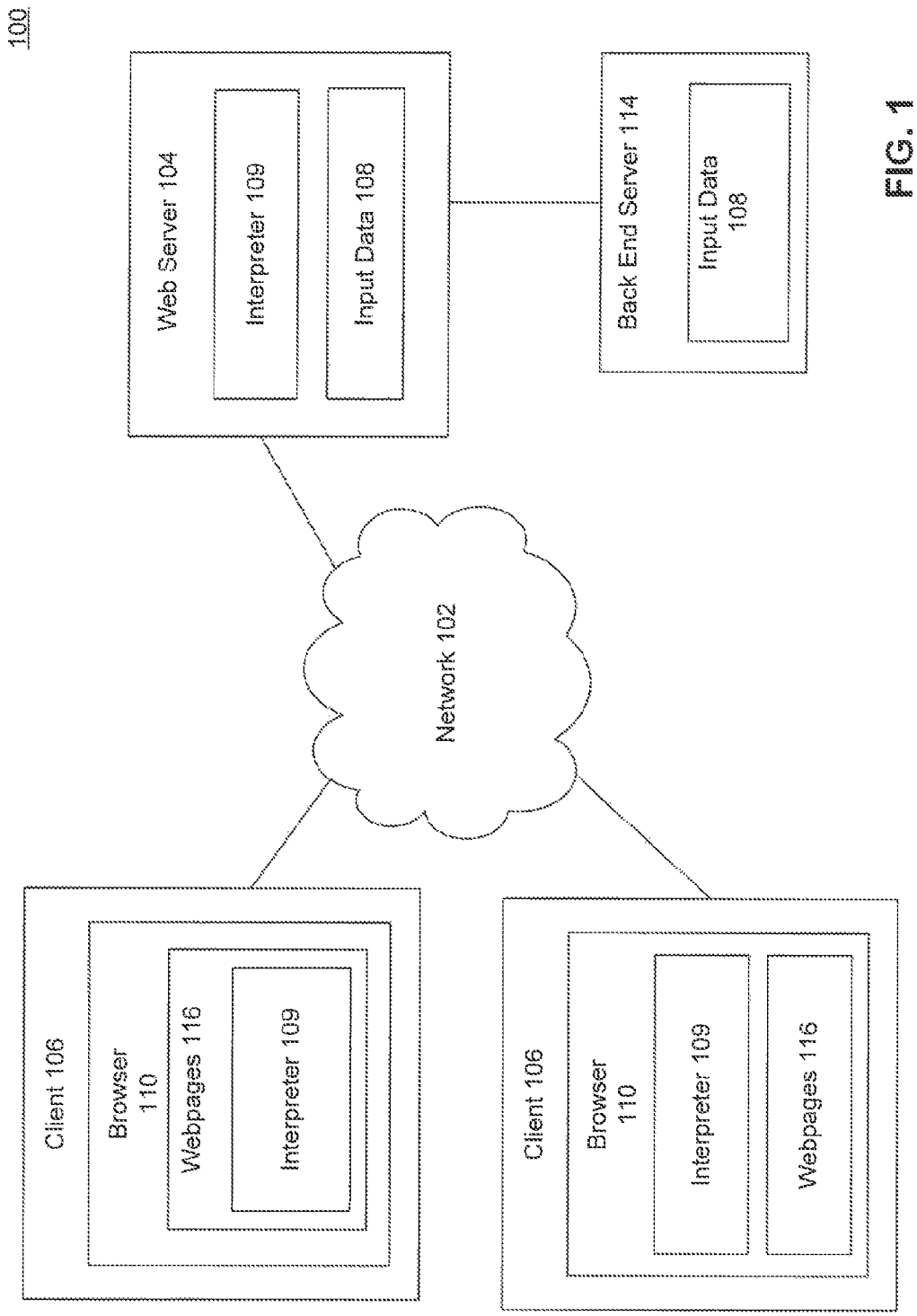
FIG. 1 is a block diagram of an exemplary system of an environment capable of generating a valid HTML document.

FIG. 1 is a block diagram of an exemplary system 100 of an environment capable of generating a valid HTML document. System 100 includes a network 102, a web server 104 and a client 106. Network 102 connects client 106 and web server 104. System 100 may include many thousands of web servers 104 and clients 106.

Network 102 may be any network or combination of networks that can carry data communication. Such a network 102 may include, but is not limited to, a local area network, metropolitan area network, and/or wide area network such as the Internet. Network 102 can support protocols and technology including, but not limited to, World Wide Web protocols and/or services. Intermediate web servers, gateways, or other servers may be provided between components of the system shown in FIG. 1 depending upon a particular application or environment.

Web server 104 is an electronic device capable of sending, receiving and storing resources. Resources can be provided over network 102. Resources include data inserted into hypertext markup language (HTML) pages, word processing documents, portable document format (PDF) documents, images, video, and feed sources, to name only a few. Web server 104 also includes input data 108. Input data 108 is data content that client 106 requests from web server 104.

In an embodiment, web server 104 includes an interpreter 109. Interpreter 109 and template building module (described below) are components of a template processing system that builds and compiles programs that produce a valid HTML documents. When web server 104 receives a hypertext transfer protocol (HTTP) request from client 106, web server 104 uses interpreter 109 to generate a valid HTML document that includes valid HTML and valid input data 108.

Backend server 114 is a database or a storage repository that stores input data 108. In an embodiment, web server 104 retrieves input data from web server 104 when it receives an HTTP request for a webpage 116. Web server 104 uses network 102 to retrieve input data 108 from backend server 114.

Client 106 is an electronic computing device capable of requesting and receiving resources over network 102. Example clients 106 are personal computers, mobile communication devices, (e.g. smart phones, tablet computing devices, notebooks), set-top boxes, game-console embedded systems, and other devices that can send and receive input data 108 over network 102. To display input data 108, client 106 may execute an application, such as a browser 110.

Browser 110 is an application that executes on client 106. Browser 110 displays HTML documents as webpages 116 to a user. In an embodiment, browser 110 can be a browser such as CHROME browser from Google, Inc.

In one embodiment, browser 110 also includes interpreter 109. Interpreter 109 processes custom attributes that web server 104 may include in the valid HTML document, and generates webpage 116 that browser 110 displays on a display screen. On client 106 side, browser 110 may have a plug-in for interpreter 109. In another embodiment, browser 110 includes interpreter 109 when browser 110 is installed on client 106. In another embodiment, interpreter 109 may be built into browser 110. In another embodiment, interpreter 109 may be a library that is included in webpage 116 and delivered to browser 110 from web server 104.

Figure 2:
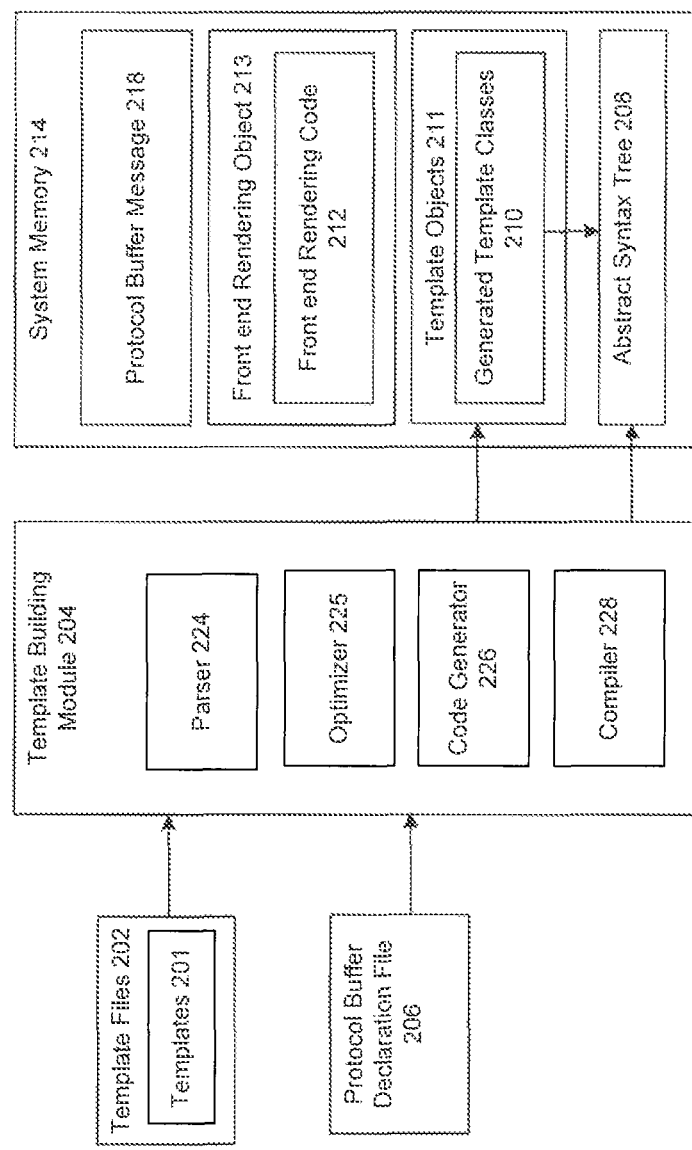
FIG. 2 is a block diagram of an exemplary embodiment of a template building module.

FIG. 2 is an exemplary embodiment 200 is including a template building module. Template building module 204 builds and compiles text and binary template objects that render a valid HTML document when executed by interpreter 109. Template building module 204 may build and compile template objects 201 on any computing device. For example, template building module 204 may exist on a computing device that a webpage developer uses to create webpage 116.

Unlike conventional systems, template processing system decouples the template building and compilation process from the rendering process. During the building and compilation process, template building module 204 uses templates 201 in template files 202 to generate abstract syntax trees (ASTs) 208, template classes 210 and template objects 211. ASTs 208 and template objects 211 are uploaded to web server 104 and are executed by interpreter 208 when web server 104 receives a request, such as an HTTP request, for webpage 116, from browser 110. When web server 104 receives such a request, interpreter 109 initiates a rendering process. During the rendering process, interpreter 109 combines template objects 211 with input data 108 and creates a valid HTML document. Browser 110 uses this HTML document to render webpage 116.

In an embodiment, template object 211 is created from template 201 in template file 202. Template 201 typically includes formatted code, such as HTML markup code, processing instructions, expressions and custom attributes that are interpreted by template building module 204. Template 201 may be statically modified by being loaded into an HTML editor or browser 110 prior to the building and compilation process.

Template building module 204 compiles and builds a template object 211 from template 201. During the compilation and building process, template building module 204 binds the input parameters included in template 201 to the definitions of the typed data structures that hold input data 108 during execution. In an embodiment, a typed data-structure is defined in protocol buffer definition file (".proto" file) 206.

Each data structure in ".proto" file 206 defines a record of information in series of name-value pairs fields with a specific data-type for each name. For example, each name is a typedefined primitive, such as an integer, a float, a string, etc., or another typed data structure. A compiler (not shown) compiles the data structure defined in ".proto" file 206 into a protocol buffer. During execution, the protocol buffer may be used as a protocol buffer message 218. Compiler also creates an application programming interface (API) that allows interpreter 109 to manipulate input data 108 stored in protocol buffer fields during runtime. A person skilled in the art will appreciate that the actual implementation of the API depends on the programming language, such as C++, Java or Python.

For example, ".proto" file "result.proto" below, includes protocol buffer "Result" and protocol buffer "Line Snippet." Protocol buffer "Result" includes a protocol buffer of datatype "LineSnippet." Protocol buffer "LineSnippet" includes data-types "string" and an unsigned integer, such as "int32".

```
message Result {
    repeated LineSnippet line_snippet_array=1;
}
message LineSnippet {
    optional string text=1;
    optional int32 id=2;
    optional string type=3;
}
```

A developer identifies data structures that pass input data 108 to template objects 211 by including a path to the file defining the data structure, such as ".proto" file 206.

When template building module 204 attempts to compile and build template object 211, it identifies the location of ".proto" file 206 and a data-type of the included data structures and its fields. Template building module 204 binds the data types of the data-structure and its field to the input parameters included in templates 201 that are set to receive input data 108 from the data structure. The binding causes the input parameter to inherit the data-type of the data structure, and as a result have a data-type. The binding eliminates data-type mismatches during runtime and guarantees to produce a valid HTML document.

Template 201 also includes custom attributes. Each custom attribute includes template processing directives. In a non-limiting example, custom attributes may include, as explained in further detail below, jsimport, jstemplate, jscontent, jsselect, jsvar and jsif, to name only a few. Exemplary template processing directives include static expressions that may be a subset of JavaScript. During runtime, interpreter 109 uses processing instructions to evaluate input data 108 and determine the placement of input data 108 in the valid HTML document. Template processing directives may also determine whether some, all or no input data 108 is displayed by the valid HTML document.

One example of a custom attribute is jsimport. Jsimport stores a location of ".proto" file 206 that template 201 uses to obtain input data 108. For example, <html jsimport="maps/jslayout/result.proto">

In the example above, "maps/jslayout/result.proto/"specifies a path to" ".proto" file 206 from which type definitions may be accessed.

Another example of a custom attribute is jstemplate. Jstemplate is a custom attribute that identifies template 201 to template building module 204 during build time.

Jstemplate also declares protocol buffer message 218 that compiled template object 211 expects to receive during runtime. For example, <div jstemplate="line_snippet_template; snippet:maps_jslayout.LineSnippet">

In the example above, template "snippet" expects input data 108 from protocol buffer message "LineSnippet" included in namespace maps_jslayout.

Custom attribute jstemplate also indicates for template building module 204 to bind the data-type of the input parameter in template 201 to the typed data structure. For example, template building module 204 should bind the input parameter "snippet" to protocol buffer message "LineSnippet." As a result, input parameter "snippet" inherits the data-type of protocol buffer message "LineSnippet."

Another example of a custom attribute is jscontent. During execution, custom attribute jscontent indicates to interpreter 109 to substitute the content of HTML element in template 201 with a value of input data 108 specified in protocol buffer message 218. For example, <span jscontent="snippet.text"></span>

In the example above, the text that is inserted between HTML tag <span> and </span> is the value of field "text", in the input parameter "snippet". As described herein, input parameter "snippet" may be used because template building module 204 bound it to data-type defined for protocol buffer "LineSnippet."

Another example of a custom attribute is jsvalues. Jsvalues sets an HTML attribute to a value of the field in the input parameter. For example, <div jsvalues="id:snippet.type+snippet.id">

In the example above, tag <div> includes text that has values from the field "type" and the value from the field "id" included in the input parameter "snippet."

In another example, a combination of custom attributes jsif and jscontent may specify conditions when specific template sections may be omitted or hidden in the valid HTML document. For example:

<div jsif="has('snippet.id')"
    jscontent="snippet.text"
    jsvalues="id:snippet.type+snippet.id">
    This text is replaced with snippet text.
</div>

In the example above, valid HTML document displays the value of the fields "text" "type" and "id" from the input parameter "snippet" if the field "id" is set to a value.

Another example of a custom attribute is jsselect. Jsselect is an example of a for loop inside template 201. For example, jsselect iterates over an array in a protocol buffer "Result" and produces lines of input data 108, different input data 108 included on each line. For example, <div jstemplate="result_template; result_message: maps_jslayout.Result">
Snippets:
<div jsselect="snippet, i, total: result_message.line_snippet_array">
<span jscontent="'snippet'+(1+i)+'of'+total">
    Text here is replaced with "snippet X of Y"
</span>
<div use="line_snippet_template_file.html#line_snippet_template">
    Text here is replaced with contents of transclusion.
</div>
</div>
</div>

In the example above, the data-type of jstemplate input parameter "result_message" is bound to the data-type of the protocol buffer message "Result." Custom attribute jsselect iterates over the field "line_snippet_array" in the input parameter "result_message." The value of the field "result_message" is written into the input parameter "snippet." Jsselect uses "i" as a counter to keep track of the number of iterations performed on the input parameter "result_message." In the example above, for each snippet in "result_message" interpreter 209 generates a line "'snippet'+(1+i)+'of'+total" where 'i' indicates the number of snippets in the valid HTML document.

In another example, custom attributes are used to access compiled functions. For example, template 201 may specify a service, such as a remote procedure call (RPC) service, and pass protocol buffer message 218 to that service. During processing, interpreter 109 may render different content based on the result of an RPC call to a given service. In an embodiment, RPC service may return input data 108 in protocol buffer message 218 as a result. For example, <div jstemplate="search_form;
    browser_rules:webserver.BrowserRulesService">
. . .
<div jsif="browser_rules.IsX( )"></div>

In the example above, template 201 renders a <div> tag only when browser 110 is of type 'X'.

In an embodiment, the interface for the RPC service may also be defined in ".proto" file 206. For the example above, an interface:

service BrowserRulesService {
    rpc IsX (EmptyMessage) returns (Boolean);
} is included in ".proto" file 206.

In another embodiment, a developer uses custom attributes in template 201 to compose output from multiple templates (also known as "transclusion"). Transclusion occurs when a content of an element, such as an HTML element in one template, replaces content from an element from another template. During the compilation and building process, when template building module 204 performs a transclusion, it guarantees that when the transcluded template is transcluded into a transcluding template, the data-type of the input parameters of the transcluded template match the data-types passed to the transcluded template. As a result, template building module 204 produces template objects that are guaranteed to generate a valid HTML document.

For example, in template file 202, such as "result_template_file.html" below, a developer defines a transcluding template.

```
<html jsimport="template/prototemplate/jslayout/examples/snippet/
result.proto">
    <div jstemplate="result_template; result_message:maps_jslayout.Result">
      Snippets:
        <div jsvars="total:size('result_message.line_snippet_array')"
            jsselect="snippet, i: result_message.line_snippet_array">
          <span jscontent="'snippet' + (1 + i) + ' of ' + total">
            Text here is replaced with "snippet X of Y"
          </span>
          <div use="line_snippet_file.html#line_snippet_template">
            Text here is replaced with transcluded and processed template.
          </div>
        </div>
    </div>
</html>
```

Template "result_template" in template file "result_template_file.html" is a transcluding template. A transcluding template is template 201 that includes a transcluded template. A transcluded template is template 201 that can render a valid HTML output stream, but that may also be included in a transcluding template. A transcluded template may be included in the same or different template file 202 as a transcluding template.

In an embodiment, custom attribute "use" in the transcluding template includes credentials that identify the transcluded template file and the transcluded template. In an embodiment, an application developer sets custom attribute "use" to a uniform resource locator (URL) that includes a path to the transcluded file, such as "line_snippet_file.html" described below.

```
<html jsimport="template/prototemplate/jslayout/examples/snippet/
result.proto">
    <div jstemplate="line_snippet_template;
              snippet:maps_jslayout.LineSnippet">
      <div jsif="has('snippet.id')"
          jscontent="snippet.text"
          jsvalues="id:snippet.type + snippet.id">
        This text is replaced with snippet text.
      </div>
    </div>
</html>
```

The URL further contains an identifier, such as "#", followed by the name of the transcluded template. For example, "#line_snippet_template" identifies a transcluded template "line_snippet_template," in template file "line_snippet_file.html".

In transclusion, the transcluded template retains the rendering credentials, such as the cascading style sheets (CSS) rules and JavaScript that are associated with the transcluded template, even when those rendering credentials are included outside of the transcluded template in the transcluded template file. For example, CSS rules may be included in the header of template file 202 and are outside of the definition of template 201. A person skilled in the art will appreciate that the CSS rules that specify a style for template 201 when it is displayed on browser 110.

In an embodiment, during transclusion, template building module 204 identifies the rendering credentials that are associated with the transcluded template, and inserts the rendering credentials into the transcluding file. For example, CSS rules that are associated with the transcluded template may be inserted into the transcluding template with the identifier that corresponds to the transcluded template. As a result, when the transcluded template is being rendered in the transcluding file, the transcluded template is governed by the associated CSS rules.

A person skilled in the art will appreciate that custom attributes and their corresponding utilization described herein are given by way of example and not limitation, and that there are other ways custom attributes may be utilized to expand dynamic functionality in template 201.

Template building module 204 includes a parser 224, an optimizer 225, a code generator 226 and a compiler 228. Parser 224 parses the HTML syntax in each template 201 included in template file 202, verifies that data-types of the input parameters are consisted with the data-types for input data 108, that paths to ".proto" files 206 and other external files are correct and that fields specified in template 201 for protocol buffer messages 218 exist in ".proto" file 206.

When parser 224 encounters a custom attribute in template 201, parser 224 also performs a syntactic analysis of the custom attribute. For example, parser 224 verifies that the syntax of each custom attribute is compatible with the format described herein.

Additionally, parser 224 parses the content of external files, such as external CSS files, referenced in template file 202. Parser 224 may indicate to compiler 228 to inline the content of the CSS files in template objects 211, such that when the HTML document is created, the output stream contains the CSS from the external CSS files directly, and not by reference to the CSS.

Because parser 224 verifies that the data-type of each input parameter is consistent with the data-type of the data structure assigned to it, and the HTML syntax in each template 201, template processing system guarantees that compiled templates 201 produce a valid HTML document. In the valid HTML document input data 108 is properly nested when the HTML document is being displayed as a webpage 116 and when HTML tags are properly closed.

When parser 224 determines that template 201 is a transcluding template, parser 224 verifies that the transcluded template file exists and is accessible to the transcluding template. For example, parser 224 determines whether the transcluded template file exists using the URL specified by the custom attribute, such as "use." If the transcluded template file exists, parser 224 also verifies that the transcluded template is defined in the transcluded template file. For example, parser 224 verifies that the transcluded template identified using the identifier "#" included in custom attribute "use" is defined in the transcluded template.

In transclusion, parser 224 verifies that the data-type of an input parameter in the transcluding template that receives the transcluded template has the same data-type as the transcluded template. For example, parser 224 determines the data-type of the input parameter in the transcluding template "result_template file.html" that receives the transcluded template. In the example above, the input parameter is "snippet" which inherits the data-type of "result_message.line_snippet_array" which is "LineSnippet" as defined in the "result.proto" file described herein. Parser 224 also determines the data-type of the transcluded template "line_snippet_template." As described herein, the data-type of template "line_snippet_template" is the data-type of a protocol buffer "maps_jalayout.LineSnippet" that is defined in "result.proto" file, and is "LineSnippet." If the data-type of the input parameter in the transcluding template and the data-type of the transcluded template do not match, parser 224 generates an error message. In an embodiment, the error message may be displayed to an application developer on a display screen of a computing device.

Parser 224 also generates AST 208 from template file 202. In an embodiment, AST 208 may be represented in a text file. In another embodiment, AST 208 may be a compiled, binary representation. In an embodiment, AST 208 may be represented as protocol buffer message 218. In an embodiment, code generator 226 generates an AST 208 for a transcluding template and a transcluded template.

The nodes in AST 208 include HTTP tags, expressions and custom attributes included in template 201. Node in AST 208 may contain tags to other AST 208. During execution, interpreter 209 traverses AST 208 in order to render HTML syntax.

In transclusion, parser 224 may generate AST 208 for the transcluding template and the transcluded template. In AST 208 for the transcluding template, parser 224 inserts a tag next to a custom attribute, such as "use" that identifies the transcluded template. In an embodiment, the tag includes an indication to interpreter 209 to parse AST 208 tree associated with the transcluded template prior to traversing to the next node in AST associated with the transcluding template.

After parser 224 parses template 201 and validates the data-type definitions between the input data 108 and input parameters, parser 224 passes the parsed template 201 to optimizer 225.

In an embodiment, optimizer 225 optimizes expressions and processing instructions in templates 201 so that the code generated from the expressions is efficient in terms of speed and system resources, such as memory and control processing unit (CPU) time when template objects 211 are executed.

Code generator 226 converts template 201 into a template class 210. In an embodiment, template class 210 has the same name as template 201. A person skilled in the art will appreciate that code generator 226 may generate template class 210 in C++, Java, Python or any other object oriented programming language known to a person skilled in the art.

Figure 3:
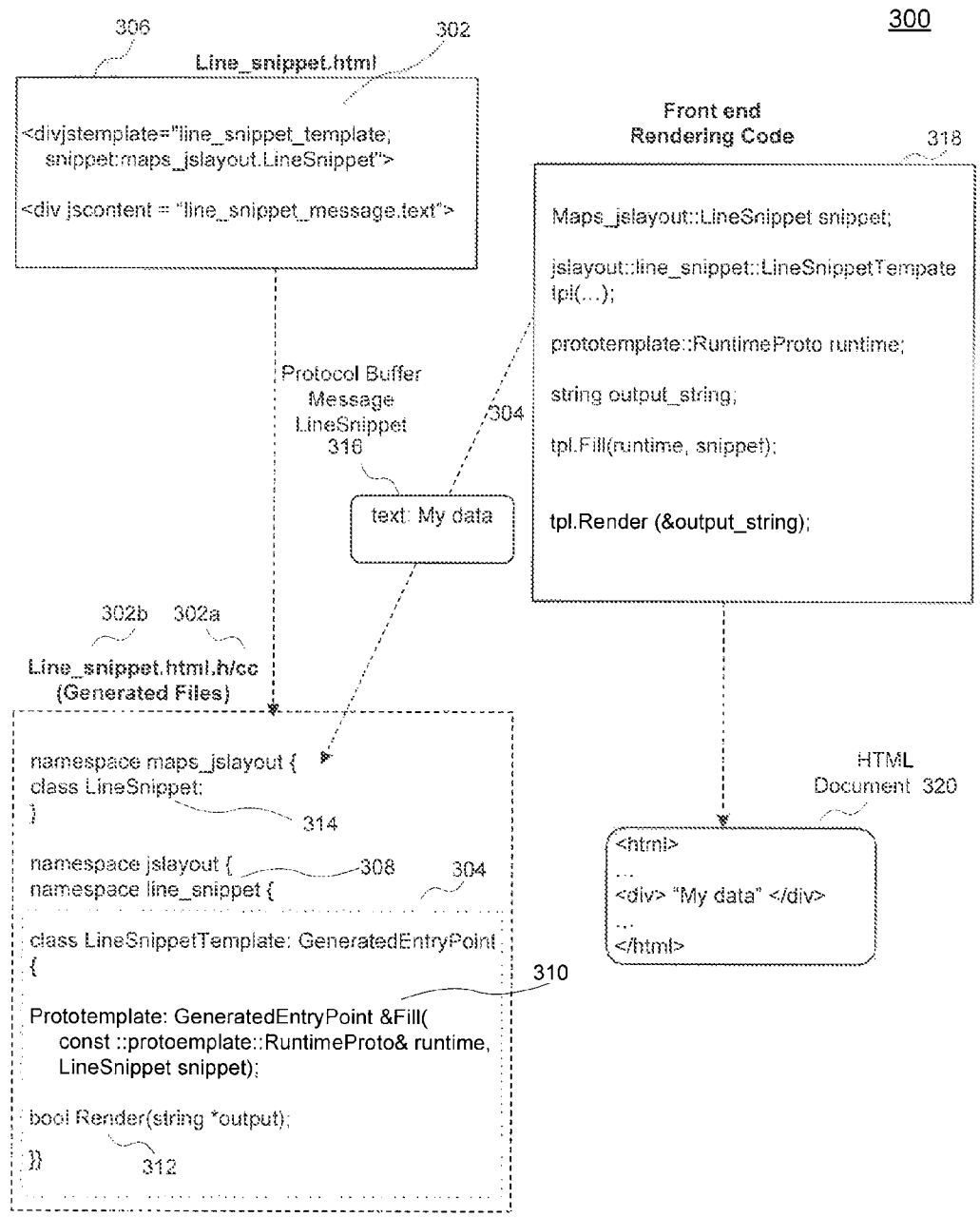
FIG. 3 is a block diagram of a template building module generating an example template class.

FIG. 3 is a block diagram 300 of a template building module generating a template class LineSnippetTemplate 304 for template "line_snippet_template" 302 in template file "line_snippet_file.html" 306. The code generation process, described herein, with references to FIG. 3.

In an embodiment, definitions and declarations for each template class 210 generated from each template 201 are stored in the definition and declaration files that correspond to the name of template 201. For example, in C++, code generator 226 generates template class LineSnippetTemplate 304 that is included in files "line_snippet_file.cc" 302a and "line_snippet_file.h" 302b from template file "line_snippet_file.html" 302. A person skilled in the art will appreciate that a ".h" file includes declaration of classes, subroutines, variable and other identifiers, while a ".cc" file includes actual implementation of the classes.

In an embodiment, code generator 226 generates a namespace for templates 201 included in template file 202. A person skilled in the art will appreciate that a namespace avoids a building conflict, such as, a conflict when compiler 228 attempts to compile templates 201 having the same name that are included in different template files 202 and template classes 210 that have the same name but different processing directives. In a further embodiment, namespace for template file 202 may be the name of template file 202. For example, for template file line_snippet_file.html" 302, code generator 226 generates namespace line_snippet_file 308. Namespace line_snippet_file 308 includes class LineSnippetTemplate 304

In template class 210, code generator 226 includes a declaration for each protocol buffer message 218 included in template 201 in the ".h" file such as "line_snippet_file.h" 302b. For example, protocol buffer message "LineSnippet" may be declared as class LineSnippet 314.

In an embodiment, code generator 226 generates a Fill( ) method and a Render( ) method for each template class 210. The Fill( ) method passes protocol buffer message 218 to template class 210 during execution. Once template class 210 obtains protocol buffer message 218, template class 210 may retrieve input data 108 from fields included in protocol buffer message 218 and use input data 108 to evaluate expressions in custom attributes such as jsselect, jsif and jsvalues. For example, class LineSnippetTemplate 304 includes a Fill( ) method 310 that passes protocol buffer message LineSnippet 316 to template class LineSnippetTemplate 304.

The Render( ) method renders an output stream that, includes HTML and input data 108 received using protocol buffer messages 218. For example, class LineSnippetTemplate 304 includes a Render( ) method 312 that renders a valid HTML document 320.

In an embodiment, code generator generates template classes 210 for a transcluding template and a transcluded template.

Going back to FIG. 2, compiler 228 converts (compiles) template classes 210 and template rendering code 212 into template objects 211. In an embodiment, compiler 228 may be a C++ compiler. However, a person skilled in the art will appreciate that a compiler for other languages, such as Java may be used. Template objects 211 are binary objects that include computer executable code that reads and manipulates input data 108.

In addition to template classes 210, a template application developer writes front end rendering code 212. Front end rendering code 212 references a declaration for each template class 210, a code to initialize and compose protocol buffer message 218 that include input data 108, a call to a Fill( ) method that passes protocol buffer message 218 to template object 211 and a call to a Render( ) method to create an output string that composes a valid HTML document. FIG. 3, includes an example front end rendering code 318 for class LineSnippetTemplate 304.

In front end rendering code 318, a protocol buffer message "LineSnippet" is declared by "mapsjslayout::LineSnippet snippet." Front end rendering code 318 also declares protocol buffer message "LineSnippet" 316 that may be used to retrieve input data 108. After input data 108 is retrieved, protocol buffer messages "LineSnippet" 316 is passed to the LineSnippetTemplate's template object 211 using the "tpl.Fill( )" method 310. Subsequently, front end rendering code 318 uses "tpl.Render( )" method 312 to render an output stream that contains a valid HTML document 320.

In an embodiment, in transclusion, a developer writes front end rendering code 212 that includes a template object 211 for the transcluding template.

Going back to FIG. 2, after application developer completes writing frontend rendering code 212, front end rendering code 212 is compiled using compiler 228 and is stored as a front end rendering object 213.

Once created, in one embodiment, ASTs 208, template objects 211 and front end rendering object 213 may be uploaded to web server 104 or another computing device that includes a interpreter 109.

System memory 214 stores compiled objects and other computing applications on a computing device. For example, once template building module 204 generates template objects 211 and abstract syntax trees 208, they may be stored in system memory 214 before being uploaded to web server 104. In another example, system memory 214 may store protocol buffer messages 218 and front end rendering object 213.

Figure 4:
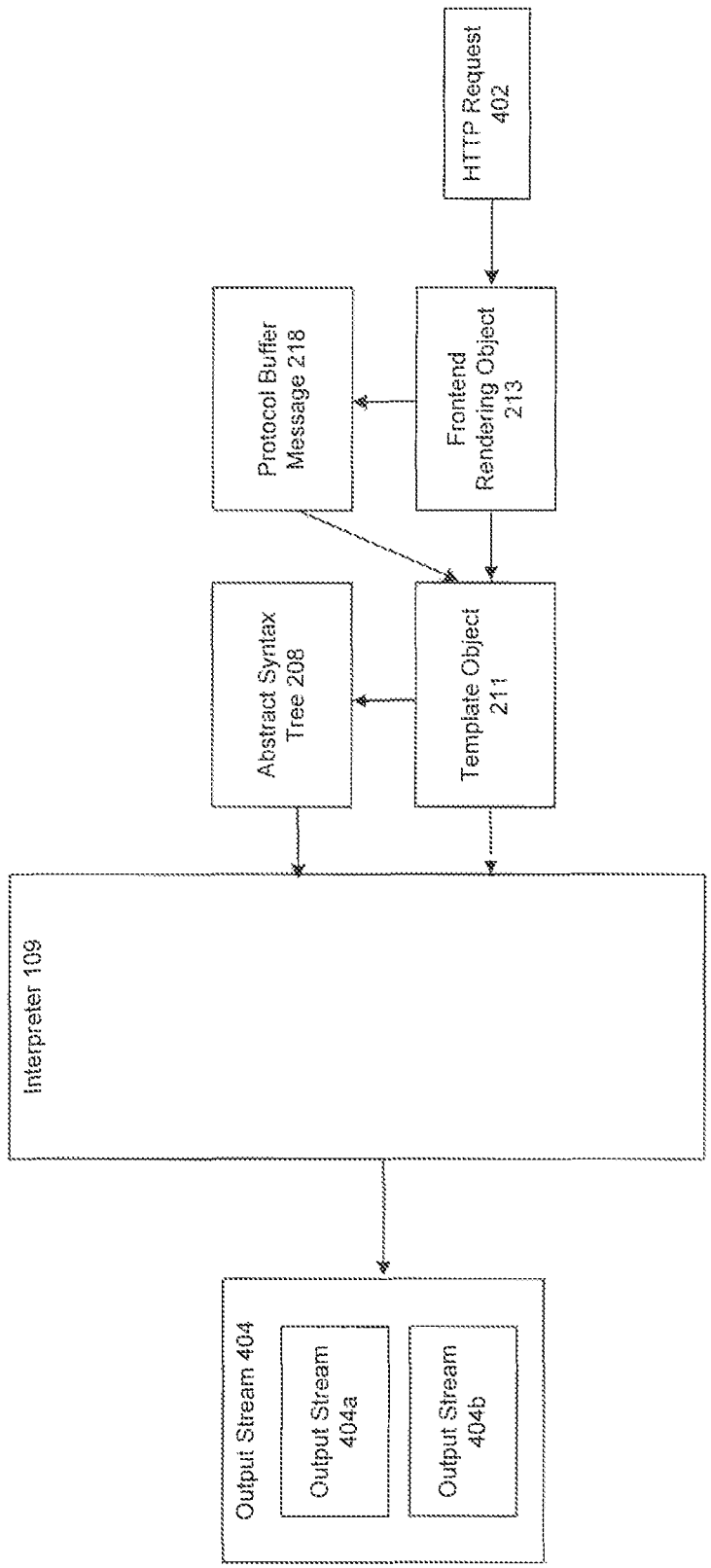
FIG. 4 is a block diagram of an interpreter generating a valid HTML document.

FIG. 4 is a block diagram 400 of an interpreter generating a valid HTML document on a web server. Block diagram 400 includes interpreter 109, AST 208, protocol buffer message 218, template object 211 and front end rendering object 213.

When web server 104 receives an HTTP request 402 for webpage 116, web server 104 passes the HTTP request 402 to frontend rendering object 213. In response to the HTTP request, frontend rendering object 213 retrieves input data 108. In an embodiment, input data 108 may be stored on web server 104 or on, for example, backend server 114 that communicates with web server 104 using network 102.

After front end rendering object 213 retrieves input data 108, front end rendering object 213 passes input data 108 to template object 211 using protocol buffer message 218. For example, front end rendering object 213 passes protocol buffer message 218 to template object 211 by executing template object's 211 Fill( ) method. In transclusion, front end rendering object 213 retrieves input data 108 for the transcluding template and transcluded template, and passes the received protocol buffer 218 to the transcluding template object.

After front end rendering object 213 passes protocol buffer message 218 to template object 211, front end rendering object 213 renders HTML output stream 404 by executing the Render( ) method. For example, when front end rendering object 213 executes the Render( ) method, template object 211 passes protocol buffer message 218 and the associated AST 208 to interpreter 109.

Interpreter 109 traverses AST 208 and generates HTML output stream 404. In an embodiment, interpreter 109 includes textual expressions embedded in the node of AST 208 in HTML output stream 404. In another embodiment, interpreter 209 evaluates processing instructions and processing directives included in custom attributes embedded in AST's 208 node using input data 108 included in protocol buffer message 218. Based on the evaluation, interpreter 209 also generates HTML output stream 404.

In an embodiment, interpreter 209 begins traversing AST 208 associated with the transcluding template. When interpreter 209 encounters a "use" custom attribute in AST 208, interpreter 209 accesses AST 208 associated with transcluded template and completes traversing that AST 208, prior to traversing the next node in AST 208 associated with the transcluding template.

In an embodiment, interpreter 109 may execute on client 106. Client 106 may activate interpreter 109 when a user opens template file 202 using a file managing application, such as WINDOWS EXPLORER or APPLE FINDER. When executing on client 106, interpreter 109 may also make a request to retrieve input data 108 from storage are located on client 106 and proceed as described herein.

After interpreter 109 renders HTML output stream 404, interpreter 109 sends HTML output stream 404 to browser 110. The HTML output stream 404 generates a valid HTML document that browser 110 displays as webpage 116.

In an embodiment, HTML output stream 404 is output stream 404a. Output stream 404a includes valid HTML syntax and input data 108. When browser 110 receives output stream 404a, browser 110 displays webpage 116 on a display screen of client 106. With HTML output stream 404a, browser 110 makes another HTTP request to web server 104 to update webpage 116, and, in response receives another output stream 404 with updated input data 108.

In another embodiment, HTML output stream 404 is output stream 404b. Output stream 404b includes custom attributes included in output stream 404b. Included, custom attributes do not interfere with browser 110 displaying webpage 116 on the display screen. The included custom attributes allow browser 110 to issue update request to update input data 108. For example, custom attribute may include a remote procedure call (RPC) function. Interpreter 109 installed on browser 110, as described herein, can execute the RPC and issue an RPC request for updated input data 108 to web server 104. In an embodiment, browser 110 makes an RPC service call using asynchronous JavaScript and XML (AJAX) applications. In response to the RPC request, web server 104 sends input data 108 to client 106. Once client 106 receives input data 108, interpreter 109 inserts the input data 109 into webpage 116, without re-rendering the webpage.

Figure 5:
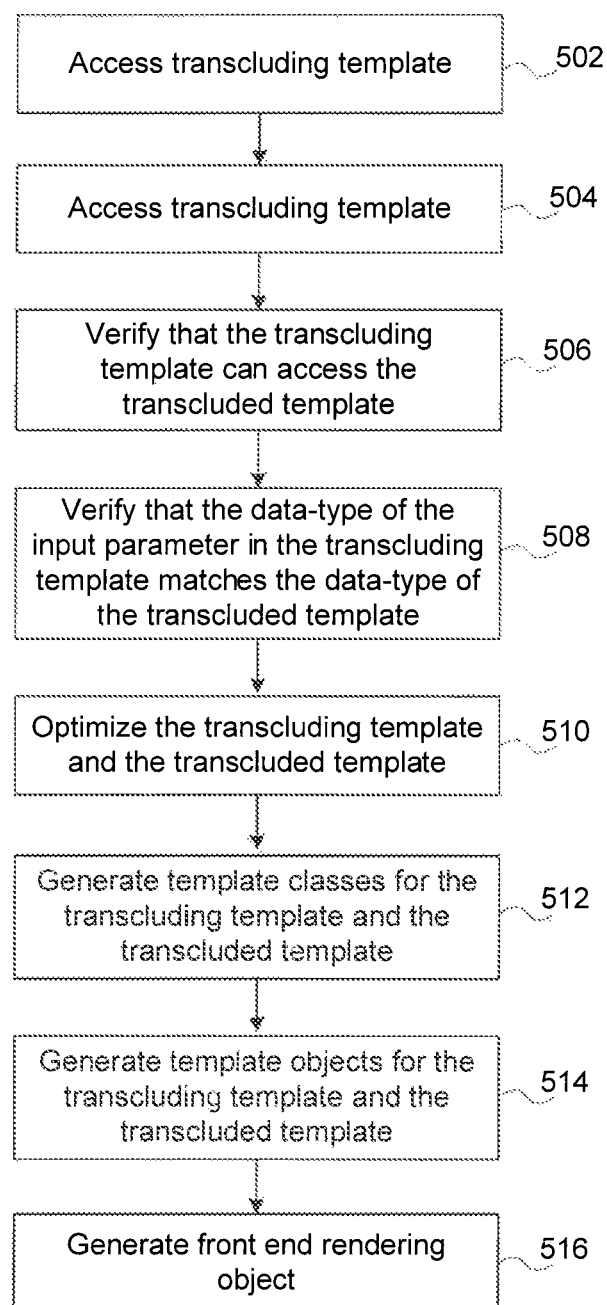
FIG. 5 is a flowchart of an exemplary embodiment for building template objects that transclude a template.

FIG. 5 is a flowchart of an exemplary embodiment 500 for building a template objects that transcludes a template, according to an embodiment.

At stage 502, the transcluding template file is accessed by, for example, template building module 204. In an embodiment, a transcluding template file includes a transcluding template and a custom attribute, such as a "use".

At stage 504, the transcluded file is accessed by, for example, template building module 204. In an embodiment, the transcluded template file includes template 201 that may be the transcluded into the transcluding template of stage 502.

At stage 506, it is verified that the transcluding template file can assess the transcluded template file. This verification may be performed by, for example, parser 224. In an embodiment, parser 224 verifies that the transcluded template file exists at a URL path specified in a custom attribute "use" in the transcluding template. At stage 506, parser 224, for example, also verifies whether the transcluded template exists in the transcluded file. For example, parser 224 verifies the name of the template that follows the identifier provided in custom attribute "use," against the name of the transcluded template.

At stage 508, parser 224, for example, verifies whether the data-type of the input parameter in the transcluding template matches the data-type of the transcluded template. If the data-type of the input parameter does not match to the data-type of the transcluded template, the flowchart ends.

At stage 510, the transcluding template and the transcluded template are optimized, by, for example optimizer 225 as described herein.

At stage 512, template classes for the transcluding and transcluded template are generated. For example, a transcluding template class and a transcluded template class are generated as described herein, by, for example code generator 226 from the transcluding template and transcluded template. At stage 512, ASTs are also generated for the transcluding and transcluded template, by, for example, code generator 226.

At stage 514, template objects are generated. For example, compiler 228 compiles a transcluding template object and a transcluded template object from template classes generated in stage 512.

At stage 516, front end rendering object is generated. For example, after developer has written the front end rendering code 212 that renders a valid HTML output stream from the transcluded and transcluding template. In an embodiment, front end rendering object 213 is generated using a C++ or another compiler, as described herein from the front end rendering code 212. As described herein, stage 516, may be performed prior to, during or after the template object building process.

When template objects of stage 514 and front end rendering object of stage 516 are generated, they may be uploaded, to, for example, web server 104.

Figure 6:
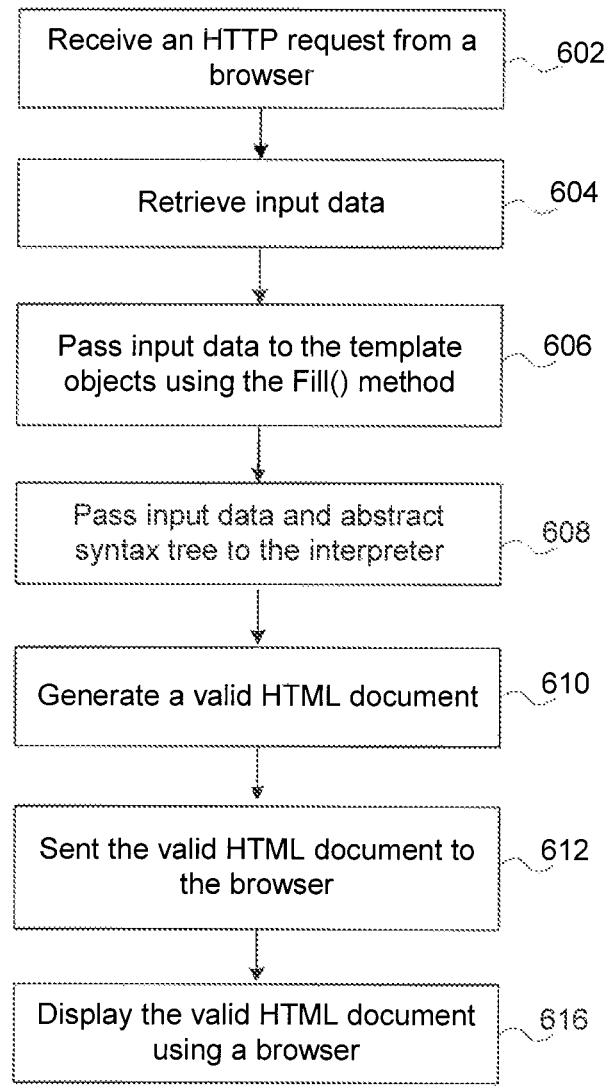
FIG. 6 is a flowchart of an exemplary embodiment for generating a valid HTML document from transcluded templates.

FIG. 6 is a flowchart of an exemplary method 600 for generating a valid HTML document, according to an embodiment.

At stage 602, a web server 104 receives an HTTP request from a client 106.

At stage 604, input data is retrieved. For example, front end rendering object 213 issues a request to retrieve input data 108 from web server 104 or back end server 114, and, in response, receives input data 108 in a form of protocol buffer message 218.

At stage 606, input data is passed to the template objects. For example, front end rendering object 213 passes protocol buffer message 218 received in stage 604 to the transcluding template object using the Fill( ) method.

At stage 608, front end rendering object begins the rendering process. For example, front end rendering object 213 executes the transcluding template object's Render( ) method. When the Render( ) method is executed, the transcluding template object passes protocol buffer message 218 received in step 606 and ASTs 208 associated with the transcluding template object to interpreter 209. For example, AST 208 associated with the transcluding template object and the transcluded template object are passed to interpreter 209.

At stage 610, a valid HTML document, is generated, by for example, interpreter 209. Interpreter 209 traverses AST 208 associated with the transcluding template. At each node in AST 208, interpreter 209 retrieves textual expressions or evaluates processing instructions included in the node using input data 108 included in protocol buffer message 218. When interpreter 209, encounters a "use" custom attribute, interpreter 209 begins to parse AST 208 associated with the transcluded template object before returning to AST 208 associated with the transcluding template object. Interpreter 209 generates HTML output stream 404 that represents a valid HTML document from the textual expressions retrieved from the nodes in ASTs 208 and textual expressions that are based on the evaluated processing instructions.

At stage 612, the valid HTML document is sent to the browser. For example, web server 104 sends HTML output stream 404 that represents a valid HTML document generated in stage 610 to browser 110.

At stage 614, browser displays the valid HTML document. For example, browser 110 displays the valid HTML document on a display screen of client 106.

Figure 7:
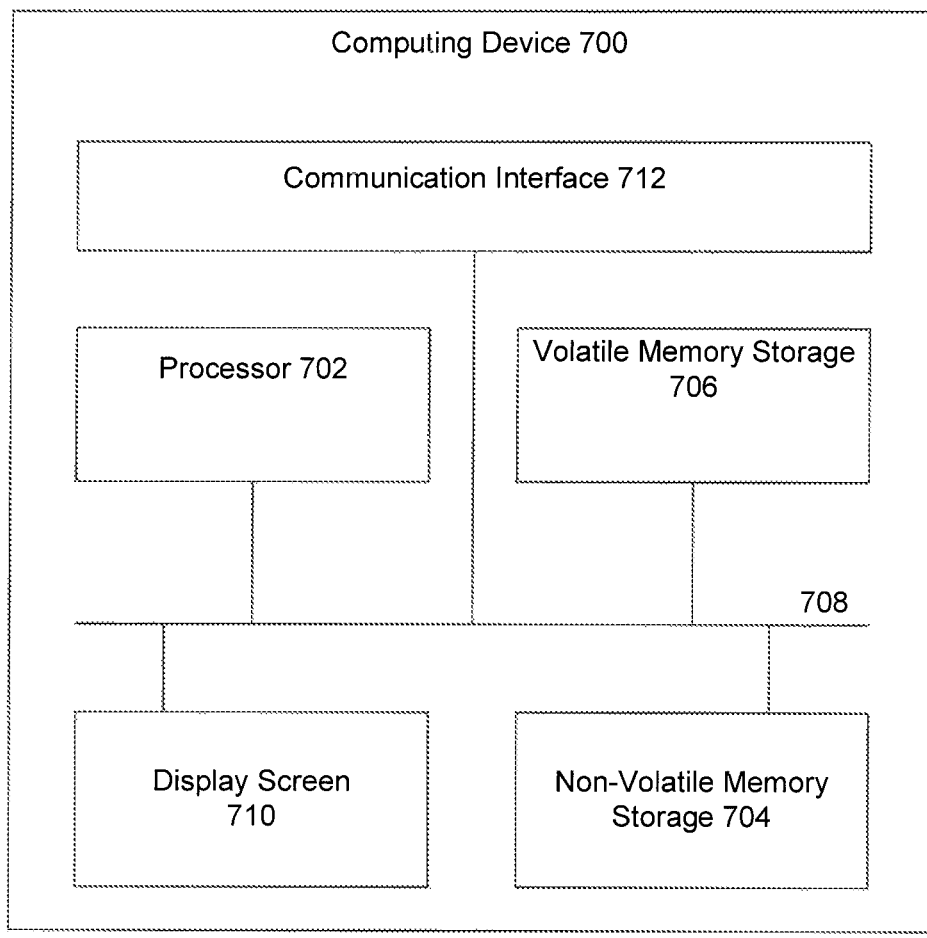
FIG. 7 is a block diagram of an example computer system.

FIG. 7 is an example computer system 700 in which embodiments of the present invention, or portions thereof, may by implemented as computer-readable code. For example, the components or modules of system 100 may be implemented in one or more computer systems 700 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-6.

Web server 104 and client 106 can include one or more computing devices. According to an embodiment, web server 104 and client 106 can include one or more processors 702, one or more non-volatile storage mediums 704, one or more memory devices 706, a communication infrastructure 708, a display screen 710 and a communication interface 712. Processors 702 can include any conventional or special purpose processor, including, but not limited to, digital signal processor (DSP), field programmable gate array (FPGA), and application specific integrated circuit (ASIC). Non-volatile storage 704 can include one or more of a hard disk drive, flash memory, and like devices that can store computer program instructions and data on computer-readable media. One or more of non-volatile storage device 704 can be a removable storage device. Memory devices 706 can include one or more volatile memory devices such as, but not limited to, random access memory. Communication infrastructure 708 can include one or more device interconnection buses such as Ethernet, Peripheral Component Interconnect (PCI), and the like.

Typically, computer instructions executing on web server 104 or client 106 are executed using one or more processors 702 and can be stored in non-volatile storage medium 704 or memory devices 706.

Display screen 710 allows results of the computer operations to be displayed to a user or an application developer.

Communication interface 712 allows software and data to be transferred between computer system 700 and external devices. Communication interface 712 may include a modem, a network interface (such as an Ethernet card), a communications port, a PCMCIA slot and card, or the like. Software and data transferred via communication interface 712 may be in the form of signals, which may be electronic, electromagnetic, optical, or other signals capable of being received by communication interface 712. These signals may be provided to communication interface 712 via a communications path. Communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for composing a valid HTML document using template transclusion, comprising:
   retrieving a transcluded template file including a transcluded template;
   retrieving a transcluding template file including a transcluding template, the transcluding template including credentials to the transcluded template;
   validating that a data-type of an input parameter in the transcluding template matches a data-type of the transcluded template;
   building a binary transcluded template object from the transcluded template and a binary transcluding template object from the transcluding template based on the validating; and
   uploading the binary transcluded template object and the binary transcluding template object to a server to generate the valid HTML document that is sent for display on a browser, wherein content in the valid HTML document associated with the transcluded template is included within content in the valid HTML document associated with the transcluding template.

2. The computer-implemented method of claim 1, wherein the credentials include a uniform resource locator (URL) and an identifier of the transcluded template, wherein the URL includes a path to the transcluded file.

3. The computer-implemented method of claim 2, further comprising:
   validating that the transcluded file is accessible using the URL; and
   validating that the transcluded template exists in the transcluded file using the identifier.

4. The computer-implemented method of claim 1, further comprising:
   generating an abstract syntax tree for the transcluded template; and
   generating an abstract syntax tree for the transcluding template, the abstract syntax tree for the transcluding template including a tag to the abstract syntax tree for the transcluded template.

5. The computer-implemented method of claim 1, further comprising:
   identifying a cascading style sheet (CSS) rule associated with the transcluded template;
   inserting the CSS rule in the transcluding template file;
   inserting a credential associated with the transcluded template into the transcluding template;
   associating the credential with the CSS rule; and
   wherein building the binary transcluding template object further comprises:
      including, based on the credential the CSS rule associated with the transcluded template in the binary transcluding template object, wherein the content in the valid HTML document associated with the transcluded template is displayed with the CSS rule associated with the transcluded template.

6. The computer-implemented method of claim 5, wherein the cascading style sheet (CSS) is included outside of the transcluded template in the transcluded template file or stored outside of the transcluded template file.

7. The computer-implemented method of claim 1, further comprising:
   identifying JavaScript code associated with the transcluded template;
   inserting the JavaScript code in the transcluding template file;
   inserting a credential associated with the transcluded template into the transcluding template;
   associating the inserted credential with the JavaScript code; and
   wherein building the binary transcluding template object further comprises including the JavaScript code associated with the transcluded template in the binary transcluding template object based on the inserted credential, wherein the content in the valid HTML document associated with the transcluded template is displayed using the JavaScript code associated with the transcluded template.

8. The computer-implemented method of claim 1, wherein the transcluded template inherits a data-type from a protocol buffer.

9. The computer-implemented method of claim 1, wherein the transcluding template inherits the data-type from the protocol buffer.

10. A system for composing a valid HTML document using template transclusion, comprising:
    a memory configured to:
       store a transcluded template file, the transcluded template file including a transcluded template; and
       store a transcluding template file, the transcluding template file including a transcluding template, the transcluding template including credentials to the transcluded template; and
    a template building module configured to:
       validate that a data-type of an input parameter in the transcluding template matches a data-type of the transcluded template;
       build a binary transcluded template object from the transcluded template based on the validation;
       build a binary transcluding template object from the transcluding template based on the validation; and
       upload the binary transcluded template object and the binary transcluding template object to a web server to generate the valid HTML document that is sent for display on a browser, wherein content in the valid HTML document associated with the transcluded template is included within content in the valid HTML document associated with the transcluding template.

11. The system of claim 10, wherein the credentials include a uniform resource locator (URL) of the transcluded file and an identifier of the transcluded template.

12. The computer-implemented method of claim 11, wherein the template building module is further configured to:
    validate that the transcluded file is accessible using the URL; and
    validate that the transcluded template exists in the transcluded file using an identifier.

13. The system of claim 10, wherein the template building module is further configured to:
    generating an abstract syntax tree for the transcluded template; and
    generating an abstract syntax tree for the transcluding template, the abstract syntax tree for the transcluding template including a tag to the abstract syntax tree for the transcluded template.

14. The system of claim 10, wherein the template building module is further configured to:
    identify a cascading style sheet (CSS) rule associated with the transcluded template;

insert the CSS rule in the transcluding template file;
insert a credential associated with the transcluded template into the transcluding template;
associate the inserted credential with the CSS rule; and
build the binary transcluding template object that based on the inserted credential includes the CSS rule associated with the transcluded template in the binary transcluding template object, wherein the content in the valid HTML document associated with the transcluded template is displayed with the CSS rule associated with the transcluded template.

15. The system of claim 14, wherein the cascading style sheet (CSS) is included outside of the transcluded template in the transcluded template file or stored outside of the transcluded template file.

16. The system of claim 10 wherein the template building module is further configured to:
identify JavaScript code associated with the transcluded template;
insert the JavaScript code in the transcluding template file;
insert a credential associated with the transcluded template into the transcluding template;
associate the inserted credential with the JavaScript code; and
build the binary transcluding template object that based on the inserted credential includes the JavaScript code associated with the transcluded template in the binary transcluding template object, wherein the content in the valid HTML document associated with the transcluded template is displayed using the JavaScript code associated with the transcluded template.

17. An article of manufacture including a computer-readable medium having instructions stored thereon that, when executed by a computing device, cause the computing device to perform operations comprising:
retrieving a transcluded template file, the transcluded template file including a transcluded template;
retrieving a transcluding template file, the transcluding template file including a transcluding template, the transcluding template including credentials to the transcluded template;
validating that a data-type of an input parameter in the transcluding template matches a data-type of the transcluded template;
building a binary transcluded template object from the transcluded template and a binary transcluding template object from the transcluding template based on the validating;
uploading the binary transcluded template object and the binary transcluding template object to a web server to generate the valid HTML document that is sent for display on a browser, wherein content in the valid HTML document associated with the transcluded template is included within content in the valid HTML document associated with the transcluding template.

18. The computer-readable medium of claim 17, wherein the credentials include a uniform resource locator (URL) of the transcluded file and an identifier of the transcluded template.

19. The computer-readable medium of claim 18, wherein the instructions that cause the building the transcluded template object and the transcluding template object, comprise instructions that, when executed by the computing device, cause the computing device to perform operations comprising:
validating that the transcluded file is accessible using the URL; and
validating that the transcluded template exists in the transcluded file using the identifier.

20. The computer-readable medium of claim 17, wherein the instructions that cause the generating comprise instructions that, when executed by the computing device, cause the computing device to perform operations comprising:
generating an abstract syntax tree for the transcluded template; and
generating an abstract syntax tree for the transcluding template, the abstract syntax tree for the transcluding template including a tag to the abstract syntax tree for the transcluded template.

21. The computer-readable medium of claim 17, wherein the transcluded template and the transcluding template inherit a data-type from a protocol buffer.

22. The computer-readable medium of claim 17, wherein the instructions that cause the building comprise instructions that, when executed by the computing device, cause the computing device to perform operations comprising:
identifying a cascading style sheet (CSS) rule associated with the transcluded template;
inserting the CSS rule in the transcluding template file;
inserting a credential associated with the transcluded template into the transcluding template;
associating the inserted credential with the CSS rule; and
wherein building the binary transcluding template object further comprises:
including the CSS rule associated with the transcluded template in the binary transcluding template object based on the inserted credential, such that the content in the valid HTML document associated with the transcluded template is displayed with the CSS rule associated with the transcluded template.

23. The computer-readable medium of claim 17, wherein the instructions that cause the building comprise instructions that, when executed by the computing device, cause the computing device to perform operations comprising:
identifying JavaScript code associated with the transcluded template;
inserting the JavaScript code in the transcluding template file;
inserting a credential associated with the transcluded template into the transcluding template;
associating the inserted credential with the JavaScript code; and
wherein building the binary transcluding template object further comprises including the JavaScript code associated with the transcluded template in the binary transcluding template object based on the inserted credential, such that the content in the valid HTML document associated with the transcluded template is displayed using the JavaScript code associated with the transcluded template.

* * * * *